US008915650B2

(12) United States Patent
Liu

(10) Patent No.: US 8,915,650 B2
(45) Date of Patent: Dec. 23, 2014

(54) MECHANISM FOR ADJUSTING THE ROTATION DIRECTION AND SPEED OF AN INNER RING AND AN OUTER RING OF A ROTARY BEARING

(71) Applicant: Fu-Jian Liu, Taoyuan (TW)

(72) Inventor: Fu-Jian Liu, Taoyuan (TW)

( * ) Notice: Subject to any disclaimer, the term of this patent is extended or adjusted under 35 U.S.C. 154(b) by 0 days.

(21) Appl. No.: 13/915,989

(22) Filed: Jun. 12, 2013

(65) Prior Publication Data

US 2013/0343687 A1    Dec. 26, 2013

(30) Foreign Application Priority Data

Jun. 21, 2012    (TW) ............................... 101122149 A

(51) Int. Cl.
*F16C 23/00*    (2006.01)
*F16C 19/04*    (2006.01)
*F16H 57/02*    (2012.01)
*F16C 19/54*    (2006.01)

(52) U.S. Cl.
CPC ................ *F16C 19/04* (2013.01); *F16H 57/02* (2013.01); *F16C 19/54* (2013.01)
USPC ......................................................... 384/519

(58) Field of Classification Search
CPC ................................. F16C 25/06; F16C 25/08
USPC ......................................................... 384/519
See application file for complete search history.

(56) References Cited

U.S. PATENT DOCUMENTS 7,223,020 B2 *    5/2007    Bauer et al. .................. 384/535

* cited by examiner

*Primary Examiner* — Phillip A Johnson
(74) *Attorney, Agent, or Firm* — Birch, Stewart, Kolasch & Birch, LLP

(57) ABSTRACT

A mechanism for adjusting the rotation direction and the speed of an inner ring and an outer ring of a rotary bearing is provided. The mechanism includes a base, a main bearing module being through the base, multiple supporting rotary bearings mounted on the base and surrounded the main bearing module, and a transmission mechanism. In the application for contact type bearing, it also includes multiple rolling elements. In the application for non-contact type bearing, it also includes a fluid. The present invention provides with the transmission mechanism to connect with the main bearing module to make the inner ring and the outer ring rotate properly.

10 Claims, 12 Drawing Sheets

MECHANISM FOR ADJUSTING THE ROTATION DIRECTION AND SPEED OF AN INNER RING AND AN OUTER RING OF A ROTARY BEARING

BACKGROUND OF THE INVENTION

1. Field of the Invention

The present invention relates to the field of the transmission mechanism, and more particularly to a mechanism for adjusting the rotation direction and speed of an inner ring and an outer ring of a rotary bearing.

2. Description of Related Art

Usually, a rotary mechanism comprises: 1. Contact type rotary bearing includes a shaft and a rotary bearing, and the rotary bearing include ball bearings, roller bearings or needle bearings; 2. Non-contact type rotary bearing includes a shaft and the hydraulic bearings, the shaft and the air bearing and so on. Under normal operating conditions, the contact type bearing often generates wear problem, and the non-contact type bearings require regularly replacing the fluid, the gaskets and the seals because of high viscous liquid or the higher pressure gas.

In order to maintain the rigidity and accuracy requirements of the rotary system, the contact portion between the shaft and the inner surface of the rotary bearing require adhesion to make no relative movement. The outer surface of the rotary bearing is also required to adhere with the support frame, so that the two have no relative movement.

In some applications, the support frame is fixed without moving, and only the shaft is rotating. In this case, the inner ring of the rotary bearing rotates with the shaft, while the outer ring does not move. On the contrary, in some applications, the shaft is fixed without moving and the support frame is rotating. In this case, the outer ring of the rotary bearing rotates with support frame, while the shaft and the inner ring do not move Although in the conventional art, the rotary mechanism can meet the requirements of the system rigidity and accuracy. However, in the applications of the contact rotary bearing, it cannot avoid the inner wear problem of the rolling elements. When the inner wear problem reaches a certain level, it must be promptly replaced bearing, which is time consuming particularly for the replacement of heavy equipment. In the application of the non-contact type rotary bearing, it is necessary to use the high viscous liquid or high pressure gas for the equipment of the high load, and therefore it required periodic replacement of the fluid, the leak-proof gaskets, and the seals.

SUMMARY OF THE INVENTION

The technical problem solved by the present invention is to provide a mechanism for adjusting the rotation direction and speed of an inner ring and an outer ring of a rotary bearing. In the application for conventional contact type bearing, the mechanism makes the inner ring and the outer ring rotate in opposite direction and the linear speeds of them are equal to or nearly equal to the tangential speeds of the rolling elements in order to reduce the sliding of the rolling elements, to increase the rolling of the rolling elements, to reduce the wear in the bearing. In the application for non-contact type bearing, the mechanism makes the outer ring and the inner ring rotate in the same direction and makes the linear speeds of the both equal or nearly equal in order to increase the velocity of the fluid (can be gas or liquid), to reduce the inner shear force between all boundary layers of the fluid.

In order to solve the above-mentioned technical problem, a technical solution provided by the present invention is: a mechanism for adjusting the rotation speed and direction of an inner ring and an outer ring in a rotation bearing, comprising: a base; a main bearing module being through the base, comprising at least one main bearing having an inner ring, an outer ring, and multiple rolling elements, wherein the inner ring connects to a shaft; multiple supporting rotary bearings mounted on the base and surrounded the main bearing module; and a transmission mechanism connected with the main bearing module to make the inner ring and the outer ring rotate in opposite direction and make the linear speeds of the both equal to or nearly equal to the tangential speeds of the rolling elements.

Wherein, the transmission mechanism is a motor and a rotation speed sensor.

Wherein, the transmission mechanism is a transmission belt.

Wherein, the transmission mechanism is a gear module.

Wherein, the main bearing is a ball bearing, a roller bearing, or a needle bearing.

In order to solve the above-mentioned technical problem, another technical solution provided by the present invention is: a mechanism for adjusting the rotation speed and direction of an inner ring and an outer ring in a rotation bearing, comprising: a base; a main bearing module being through the base, comprising at least one main bearing having an inner ring, an outer ring, and a fluid filled between the inner ring and the outer ring, wherein the inner ring connects to a shaft; multiple supporting rotation bearings mounted on the base and surrounded the main bearing module; a transmission mechanism connected with the main bearing module to make the outer ring and the inner ring rotate in the same direction and makes the linear speeds of the both equal or nearly equal.

Wherein, the transmission mechanism is a motor and a rotation speed sensor.

Wherein, the transmission mechanism is a transmission belt.

Wherein, the transmission mechanism is a gear module.

Wherein, the main bearing is a hydraulic bearing or an air bearing.

The beneficial effect of the present invention is: comparing to the prior art, the present invention provides with the transmission mechanism to make the inner ring and the outer ring rotate properly. In the application for contact type bearing, the mechanism can reduce the sliding of the rolling elements, to increase the rolling of the rolling elements, to reduce the wear in the bearing. In the application for non-contact type bearing, the mechanism makes the fluid between the inner ring and the outer ring generate an equal direction motion in order to reduce the shear force between all boundary layers of the fluid, reduce the number of times to periodically replace the fluid, the leak-proof gaskets, and the seals.

DETAILED DESCRIPTION OF THE PREFERRED EMBODIMENT

The following content combines with the drawings and the embodiment for describing the present invention in detail.

Figure 1:
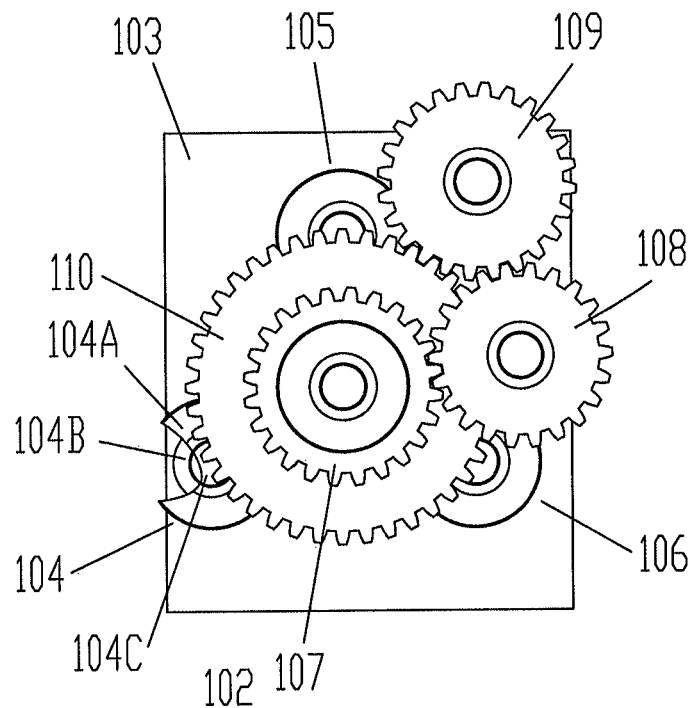
FIG. 1 is a main diagram of the gear and the contact type rotary bearing according to the present invention.
Figure 2:
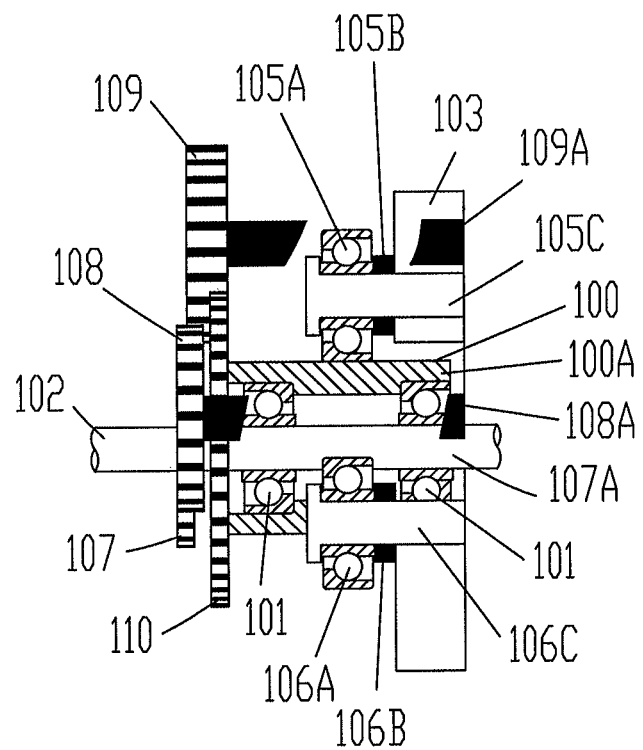
FIG. 2 is a cross sectional view of the gear and the contact type rotary bearing according to the present invention.

With reference to FIG. 1 and FIG. 2, FIG. 1 is a main diagram of the assembly mechanism of the gear and the contact type rotary bearing according to the present invention. FIG. 2 is a cross sectional diagram. The assembly mechanism of contact type rotary bearing and the gear comprises a base 103, a main bearing module 100 runs through the base 103, multiple supporting rotary bearings 104, 105 and 106 mounted on the base 103 and surrounded the main bearing module 100, and a transmission mechanism 107, 108, 109 and 110. The main bearing module 100 comprises at least one rotary bearing.

In the application of the contact type rotary bearing, the main bearing module 100 includes an inner ring, an outer ring and multiple rolling elements. The inner ring connects with a shaft 102 and the main bearing module 100 connects with the transmission mechanism. In the application of the contact type bearing, the outer ring and the inner ring rotate in opposite direction and the linear speeds of them are equal to or nearly equal to the tangential speed of the rolling elements.

Figure 3:
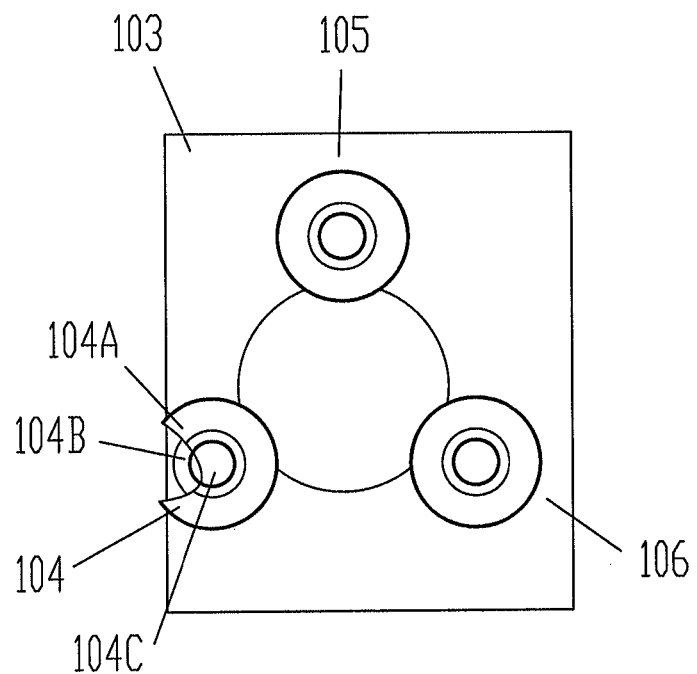
FIG. 3 is a schematic diagram of the supporting bearings of a contact type or a non-contact type according to the present invention.
Figure 4:
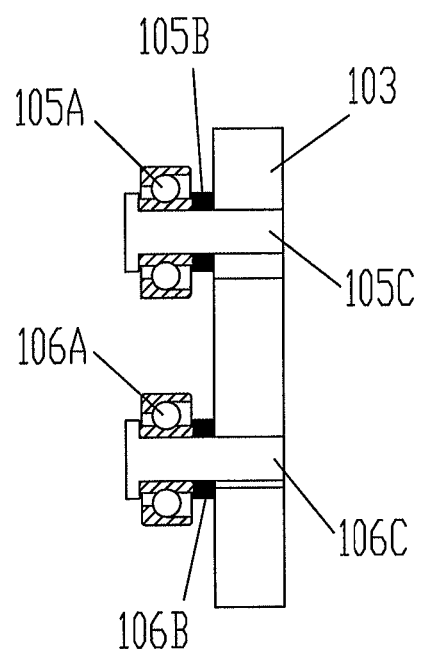
FIG. 4 is a cross sectional view of the supporting bearings of a contact type or a non-contact type according to the present invention.

In the application of the contact type bearing, please refer to FIG. 3 and FIG. 4. FIG. 3 is a schematic diagram of the supporting bearings according to the present invention, and FIG. 4 is a cross sectional view.

In the center of the base 103, it provides with a hole at the center of the base 103 so that the main bearing module 100 and the shaft 102 are able to pass through the base 103. At an appropriate position around the center hole, it provides with a first supporting bearing 104, a second supporting bearing 105 and a third support bearing 106 for supporting the main bearing module 100 to guarantee the rigidity of the entire device. The supporting bearings 104, 105, and 106 include three bearings 104A, 105A, and 106A; three washers 104B, 105B, and 106B; three fixed shafts 104C, 105C, and 106C.

Figure 5:
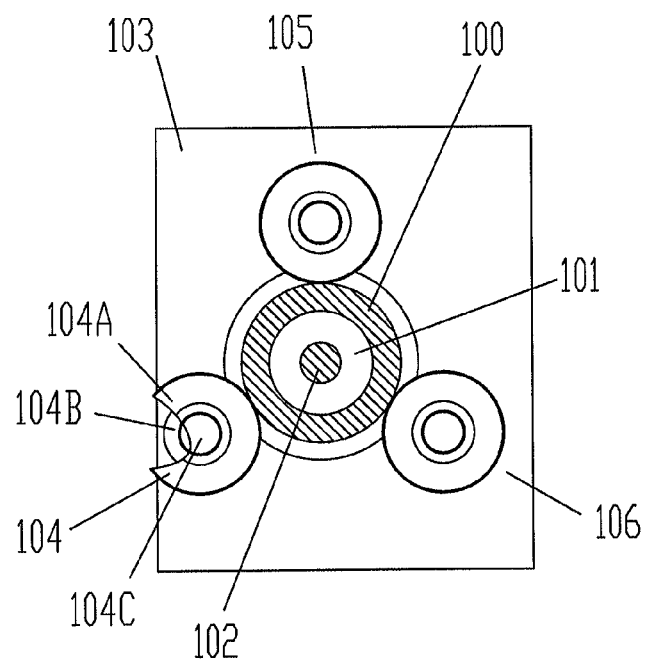
FIG. 5 is a schematic diagram of the main bearing with contact type according to the present invention.
Figure 6:
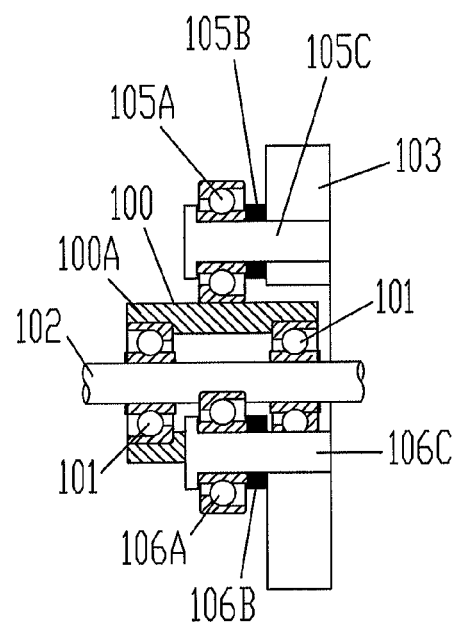
FIG. 6 is a cross sectional diagram of the main bearing with contact type according to the present invention.

FIG. 5 is a schematic diagram of the main bearing with contact type according to the present invention. FIG. 6 is a cross sectional view. Wherein, the main bearing module 100 may comprise only one main bearing 101 or multiple main bearings 101. The outer surface 101B (shown in FIG. 8) of the outer ring 101A (shown in FIG. 7) of the main bearing 101 is embedded into an outer sleeve 100A, and the shaft 102 pass through the main bearing 101.

Figure 7:
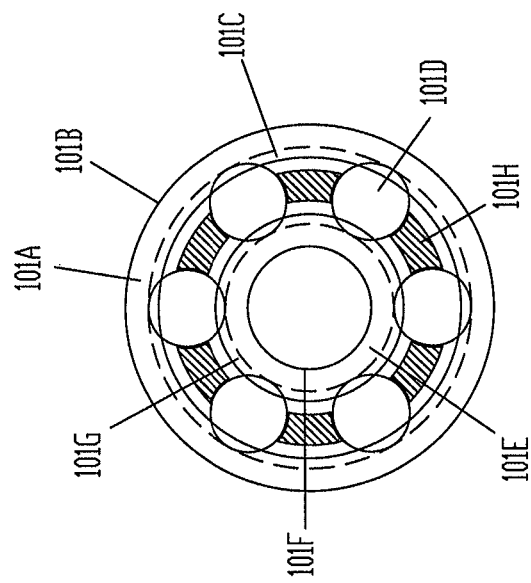
FIG. 7 is a schematic diagram of the main bearing with contact type according to the embodiment of the present invention.
Figure 8:
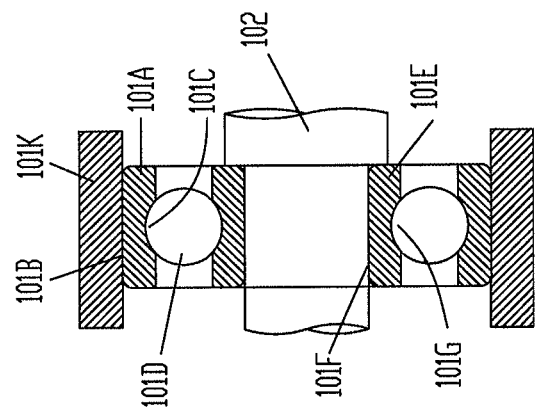
FIG. 8 is a cross sectional diagram of the main bearing with contact type according to the embodiment of the present invention.

FIG. 7 is a schematic diagram of the main bearing with contact type according to the embodiment of the present invention. FIG. 8 is a cross sectional view. Here, it uses the ball bearing in the rotary bearing for example, and the outer ring 101A is fixed.

The main bearing 101 includes multiple balls 101D (the rolling elements described above), an inner ring 101E, an outer ring 101A and a cage 101H. Wherein, an inner surface 101F of the inner ring 101E is connected with the shaft 102. On the other surface, an inner ring groove 101G is connected with the balls 101D. The outer surface 101B of the outer ring 101A is connected with the fixed frame 101K, and the fixed frame 101K is fixed without rotating. An outer ring groove 101C is connected with the balls 101D. The balls 101D are secured by the cage 101H, and they can only roll or slide along the orbit formed by the inner ring groove 101G and the outer ring groove 101C.

Figure 9:
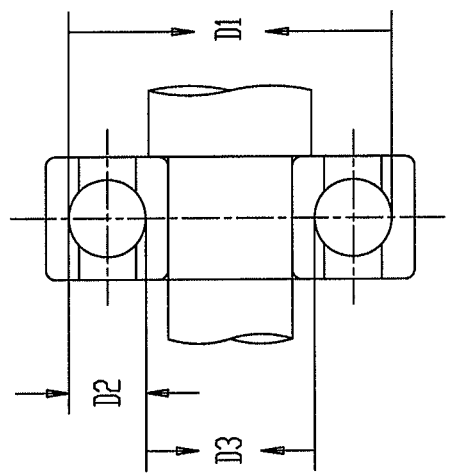
FIG. 9 is a schematic dimension diagram of the main bearing with contact type according to the present invention.

With reference to FIG. 9, FIG. 9 is a schematic dimension diagram of the main bearing with contact type according to the present invention. Here, the diameter of the ball is D2, the inner diameter of the outer ring groove 101C of the bearing is D1 and the outer diameter of the inner ring groove 101G of the bearing is D3. The above dimensions can be adjusted by the person skilled in the art according to the actual requirement. The present invention will not limit it.

Figure 10:
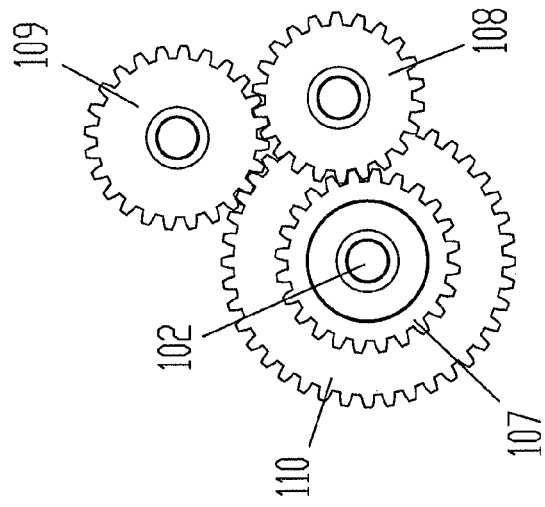
FIG. 10 is a schematic structure diagram illustrating the gear module as transmission mechanism of the contact type rotary bearing according to the present invention.
Figure 11:
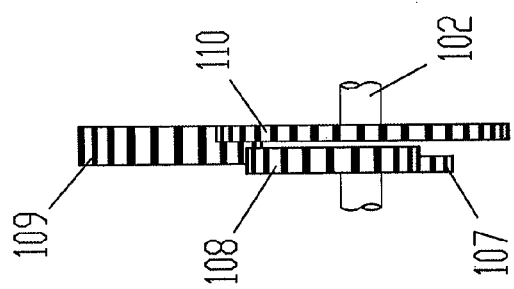
FIG. 11 is a cross sectional diagram illustrating the gear module as transmission mechanism of the contact type rotary bearing according to the present invention.
Figure 12:
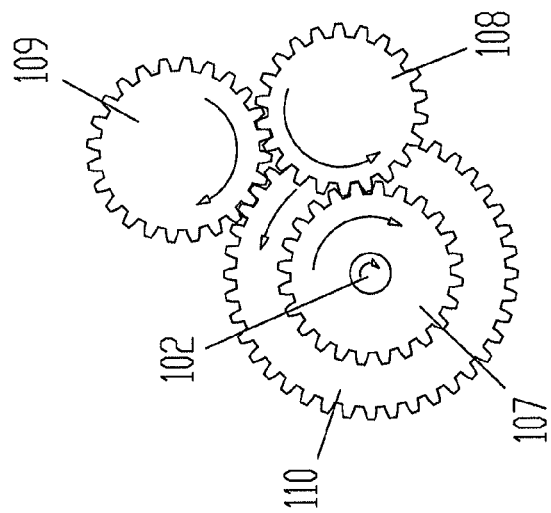
FIG. 12 is a schematic transmission diagram illustrating the gear module as transmission mechanism of the contact type rotary bearing according to the present invention.

With reference to FIG. 10, FIG. 11, and FIG. 12, FIG. 10 is a schematic structure diagram illustrating the gear module as transmission mechanism of the contact type rotary bearing according to the present invention. FIG. 11 is a cross sectional diagram. FIG. 12 is a schematic transmission diagram. Wherein, the transmission mechanism includes at least four gear modules, and respectively, an inner ring gear 107, a first transmission gear 108, a second transmission gear 109, and an outer ring gear 110. It inserts the inner ring gear 107 on the shaft 102. The inner ring gear 107 engages with the first transmission gear 108, and the first transmission gear 108 engages with the second transmission gear 109, and finally, the second transmission gear 109 engages with the outer ring gear 110.

When the shaft 102 rotates clockwise, the inner ring gear 107 rotates clockwise as the shaft 102. The first transmission gear 108 rotates counterclockwise. Then, the second transmission gear 109 rotates clockwise, and finally, the outer ring gear 110 rotate counterclockwise direction.

Figure 13:
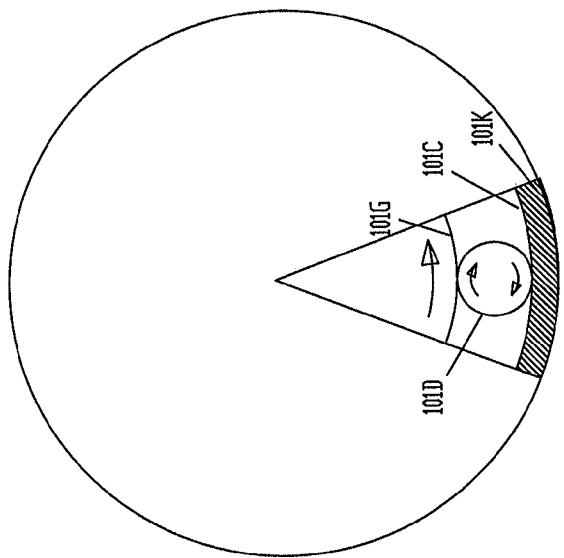
FIG. 13 is a first schematic rolling diagram of the contact type rotary bearing according to the present invention.

With reference to FIG. 7 and FIG. 13, FIG. 13 is a first schematic rolling diagram of the contact type rotary bearing according to the present invention. Wherein, the outer ring 101A is connected with the fixed frame 101K, that is, the outer ring 101A is stationary, and its speed is zero. The inner ring 101E is connected with the shaft 102, that is, the inner ring 101E and the shaft 102 have the same rotation speed. The balls 101D rotate at the contact portions of the inner ring groove 101G, and there is no (or very small) friction. However, because the outer ring 101A does not rotate, the balls 101D slide at the contact portions of the outer ring groove 101C friction and it generates friction at the contact portions.

The linear displacement of the ball 101D close to S1, the angular displacement is θ2, wherein $$S1=(D2/2)\times(\theta2/\pi)$$

Its rotation speed is $$\omega=\theta2/t$$

The angular velocity of the outer ring is 0, so that the linear displacement is 0;

Thus, it generates sliding between the ball 101D and the outer ring 101A.

From the above relationship:

When the outer ring 101A is fixed, and the inner ring 101E is rotated. The balls 101D and the inner ring 101E rotate synchronously. The balls 101D are rolling there, and there are no frictions (or friction is small). Because the outer ring 101A is fixed, its speed is 0. The balls 101D are sliding there, and the balls 101D generate friction at the contact portions of the outer ring groove 101C.

Figure 14:
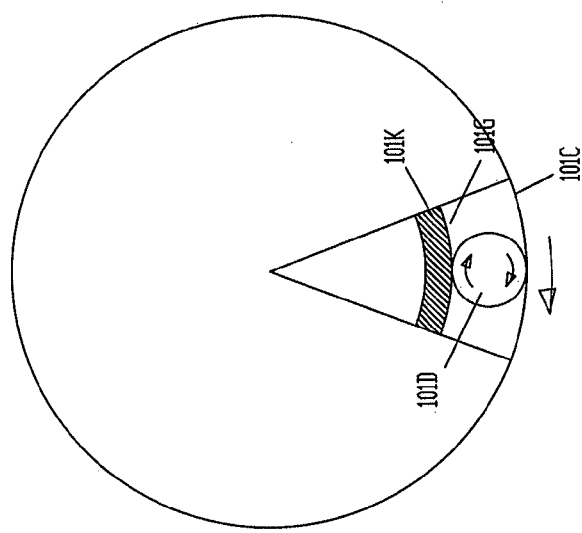
FIG. 14 is a second schematic rolling diagram of the contact type rotary bearing according to the present invention.

With reference to FIG. 14, FIG. 14 is a second schematic rolling diagram of the contact type rotary bearing according to the present invention. When the outer ring 101A rotates and the inner ring 101E is fixed, the balls 101D and the outer ring 101A rotate synchronously. The ball 101D are rolling here, and there is no friction (or friction is small) there. Because the inner ring 101E is fixed, its speed is 0. The balls 101D slide here, and it generates friction at the contact portion of the ball 101D and inner ring groove 101G.

Figure 15:
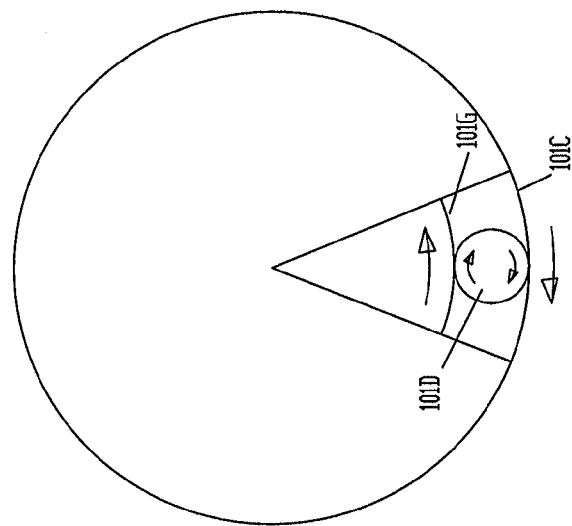
FIG. 15 is a third schematic rolling diagram of the contact type rotary bearing according to the present invention.

With reference to FIG. 15, FIG. 15 is a third schematic rolling diagram of the contact type rotary bearing according to the present invention. Wherein, the present invention uses a gear module to connect the inner and outer ring of the bearing so that the inner ring and the outer ring rotate in opposite direction and the linear speeds of them are equal to or nearly equal to the tangential speeds of the rolling elements.

In this case, the balls only rolling at the inner ring and the outer ring, and therefore it does not generate friction (or very small friction).

When the angular displacement of the inner 101E is θ3 degree, the linear displacement is S3, wherein:

$S3=(D3/2)\times(\theta3/\pi)$; D3 can be seen as the pitch circle diameter of the inner ring gear 107, Therefore, the term θ3/π can be seen as the number of the teethes of the inner ring gear 107;

When the linear displacement of the outer ring 101A is also S3, the angular displacement of the outer ring 101A is θ4 degree, wherein:

$$S3=(D1/2)\times(\theta4/\pi);$$

D1 can be seen as the pitch circle diameter of the outer ring gear 110;

Therefore, the term θ4/π can be seen as the number of the teethes of the outer ring gear 110;

D3:D1=the number of the teethes of the inner ring gear:the number of the teethes of the outer ring gear;

That is, the circle diameter of the inner ring gear: the circle diameter of the outer ring gear=the number of the teethes of the inner ring gear: the number of the teethes of the outer ring gear;

In accordance with the above formula for selection of the appropriate number of teethes of the gears, the inner ring 101E and the outer ring 101A rotate in opposite direction and the linear speeds of them are equal to or nearly equal to the tangential speeds of the rolling elements. It connects at least four gears such that the inner ring 101E and the outer ring 101A rotate in opposite direction. Such mechanism can make the balls 101D roll without sliding within the orbit formed by the inner ring groove 101G and the outer ring groove 101C. Therefore, the balls 101D at the contact portions of the inner ring groove 101G and the outer ring groove 101C does not generate friction (or friction is very small).

Figure 16:
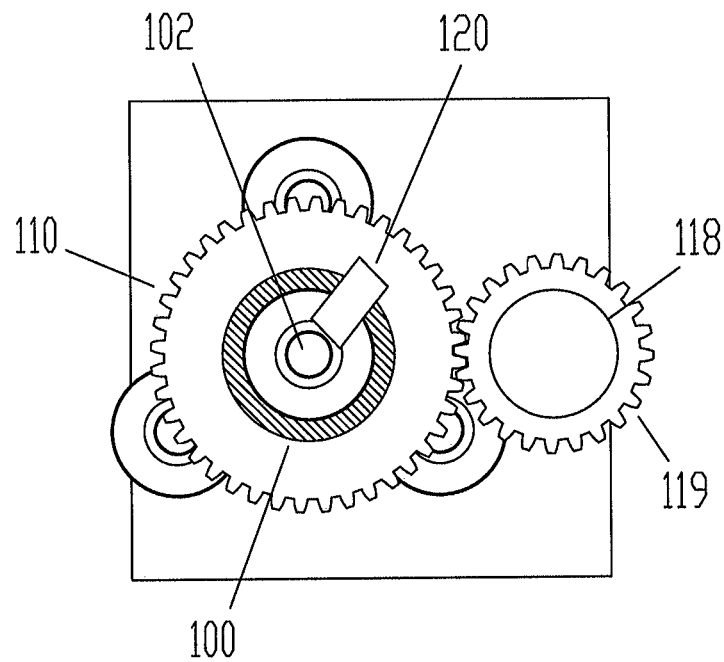
FIG. 16 is a main diagram illustrating the motor and the rotation speed sensor as the transmission mechanism of the contact type rotary bearing according to the present invention.
Figure 17:
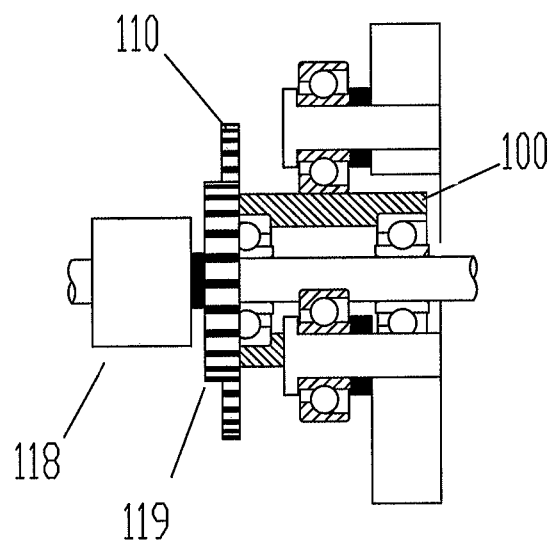
FIG. 17 is a cross sectional view illustrating the motor and the rotation speed sensor as the transmission mechanism of the contact type rotary bearing according to the present invention.

In another embodiment of the present invention, the transmission mechanism is a motor and a rotation speed sensor. Please refer to FIG. 16 and FIG. 17 for the bearing with contact type, FIG. 16 is a main diagram illustrating the motor and the rotation speed sensor as the transmission mechanism of the contact type rotary bearing according to the present invention. FIG. 17 is a cross sectional view illustrating.

Wherein, the motor 118 has a transmission gear 119, and the transmission gear 119 engages with the outer ring gear 110 and drives it to rotate. The rotation speed sensor 120 is located at a side of the shaft 102 for inputting the rotation speed and the direction of the shaft 102 to the controller (not shown) of the motor 118. The motor 118 makes the inner ring 101E and the outer ring 101A rotate in opposite direction and make the linear speeds of them equal to or nearly equal to the tangential speeds of the rolling elements.

Figure 18:
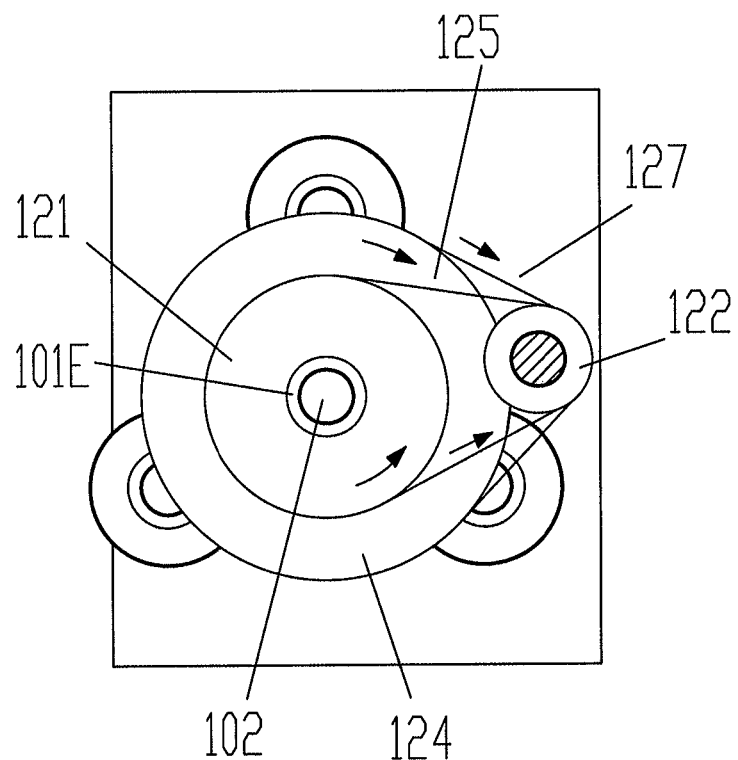
FIG. 18 is a main diagram illustrating the transmission belt as the transmission mechanism of the contact type rotary bearing according to the present invention.
Figure 19:
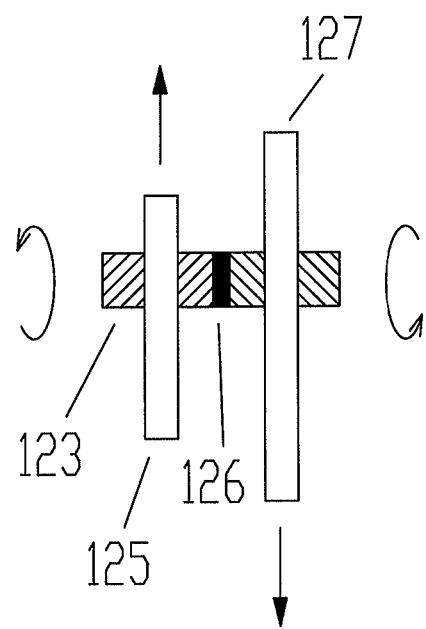
FIG. 19 is a cross sectional view illustrating the transmission belt as the transmission mechanism of the contact type rotary bearing according to the present invention.

In another embodiment of the present invention, the transmission mechanism is a transmission belt. Please refer to FIG. 18 for the application of the bearing with contact type. FIG. 18 is a main diagram illustrating the transmission belt as the transmission mechanism of the contact type rotary bearing according to the present invention. FIG. 19 is a cross sectional view.

The inner ring 101E connects to an inner pulley 121, and there are also a first pulley 122 and an outer pulley 124. One side of the two-sections transform shaft 123 is inserted into the first pulley 122, and the middle of the two-sections transform shaft 123 has a reverse rotation mechanism 126. The function of the mechanism 126 is to make both sides of the two-sections transform shaft 123 rotate in opposite direction and equal speed. An inner ring belt 125 drives the first pulley 122. One side of the two-sections transform shaft 123 rotate as the inner ring belt 125 in the same direction and speed, and the other side of the two-sections transform shaft 123 rotates in the opposite direction and the same speed in order to drive an outer ring belt 127. The outer belt 127 drives the outer ring 101A to make the inner ring 101E and the outer ring 101A rotate in opposite direction and make the linear speeds of them equal to or nearly equal to the tangential speeds of the rolling elements.

Based on the above, in the application for the bearing with contact type, the inner ring and the outer ring rotate in opposite direction and the linear speeds of them equal to or nearly equal to the tangential speeds of the rolling elements in order to reduce the sliding of the rolling elements, to increase the rolling of the rolling elements, to reduce the wear in the bearing, and to achieve the purpose of extending life.

Figure 20:
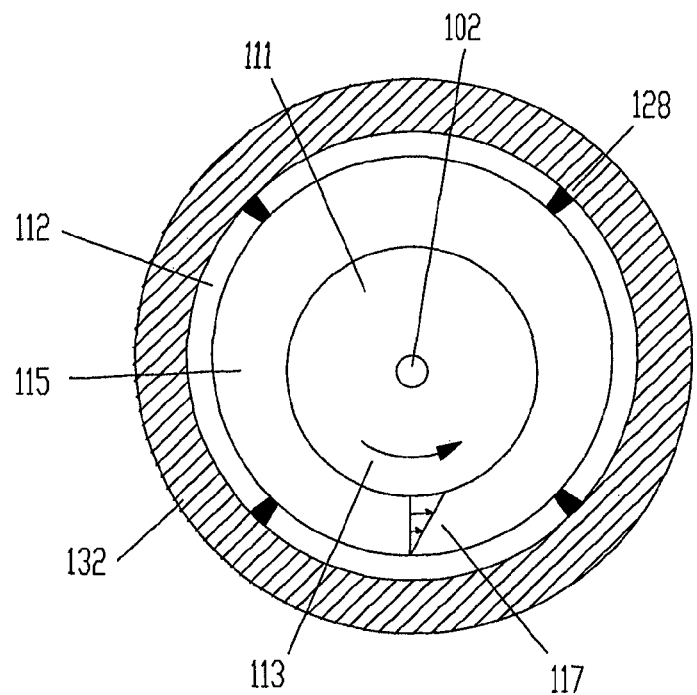
FIG. 20 is a first schematic diagram of the non-contact type rotary bearing according to the present invention.
Figure 21:
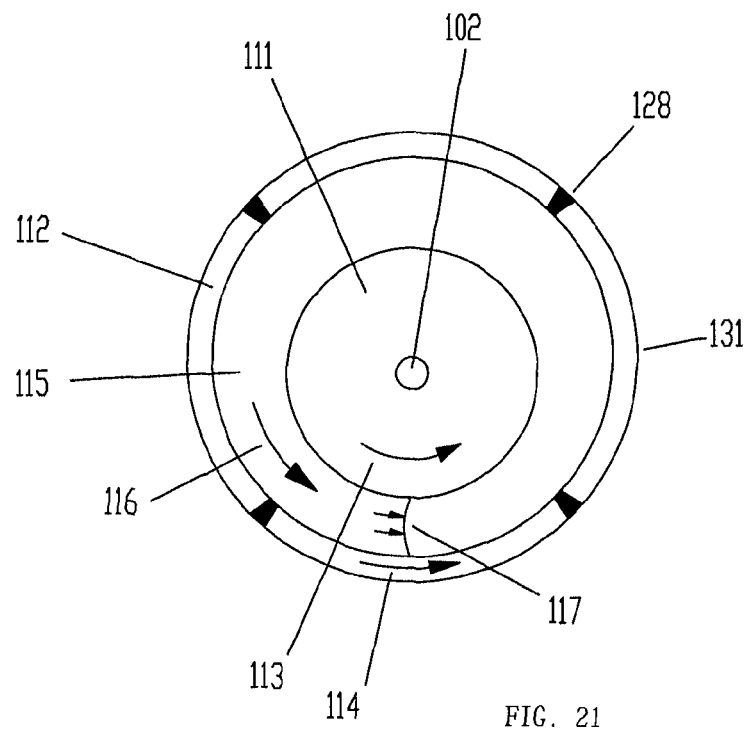
FIG. 21 is a second schematic diagram of the non-contact type rotary bearing according to the present invention.

In the application for the non-contact type bearing, the main bearing includes an inner ring, an outer ring, and a fluid filled between the inner ring and the outer ring. The inner ring connects to a shaft, and the main bearing module provides with a transmission mechanism such that the outer ring and the inner ring rotate in the same direction and the linear speeds of the both are equal or nearly equal. With reference to FIG. 20 and FIG. 21, FIG. 20 is a first schematic diagram of the non-contact type rotary bearing according to the present invention.

Wherein, at least one fluid jet inlet 128 is located at an outer ring 112 of the non-contact type rotary bearing 131 and connects to an external fluid. The fluid with high-pressure state is injected into the gap between the outer ring 112 and the inner ring 111 at the fluid jet inlet 128. The excess fluid is discharged via at least one fluid vent port 129 (shown in FIG. 23). The outer ring 112 of the non-contact rotary bearing is fixed with a fixed frame 132, that is, the outer ring 112 of the non-contact rotary bearing is stationary, and its rotation speed is zero. The flow speed of the fluid layer at this surface is zero. The inner ring 111 of the non-contact rotary bearing is fixed to the shaft 102. That is, the rotation speed of the inner ring 111 of the non-contact rotary bearing and the shaft 102 are the same. The flow speed of the fluid layer at this surface is V.

Therefore, the speed difference between the all boundary layers of the fluid are large, that is, all shear force 117 are large. With reference to FIG. 21, FIG. 21 is a second schematic diagram of the non-contact type rotary bearing according to the present invention. Wherein, the present invention uses a transmission mechanism to link the outer and the inner ring such that the rotation velocity of the inner ring 113 and the rotation velocity of the outer ring 114 are the same in direction and the linear speeds of the both are equal or nearly equal.

In this case, the fluid velocity of the boundary layer at the surface of the inner ring 111 and the fluid velocity of the boundary layer at the outer ring surface 112 are equal. Thus, the fluid 115 between the inner ring 111 and the outer ring 112 generates an equal direction motion. The motion velocity of the fluid is 116. Therefore the shear force 117 between all boundary layers are reduced. Thus, it can reduce the number of times to periodically replace the fluid, the leak-proof gaskets, and the seals.

Figure 22:
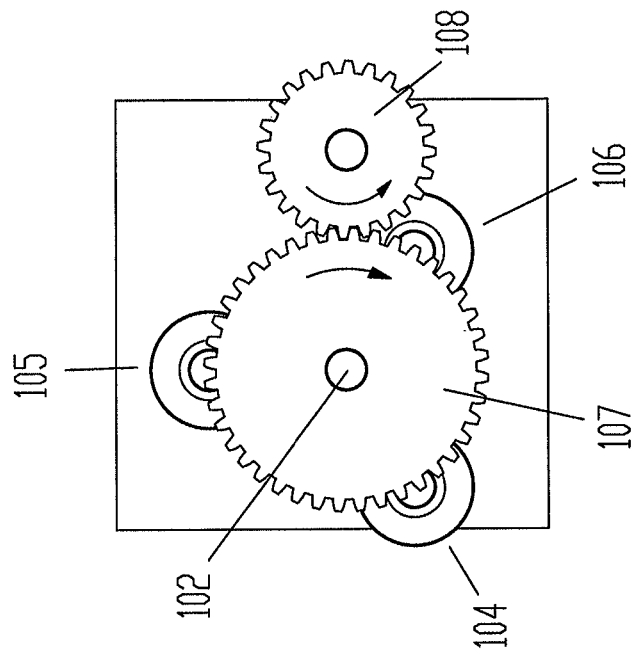
FIG. 22 is a main diagram illustrating the gear module as the transmission mechanism of the non-contact rotary bearing according to the present invention.
Figure 23:
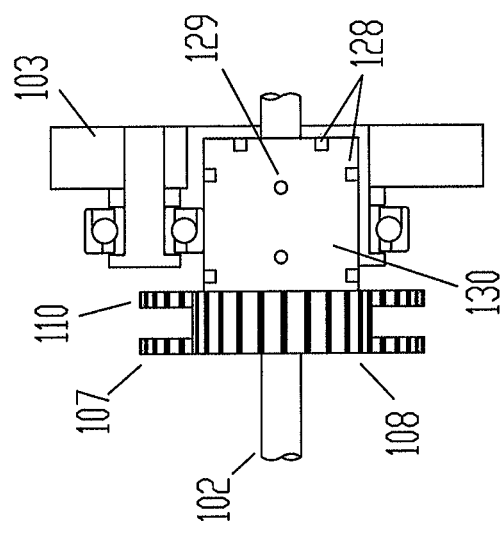
FIG. 23 is a cross sectional view illustrating the gear module as the transmission mechanism of the non-contact rotary bearing according to the present invention.
Figure 24:
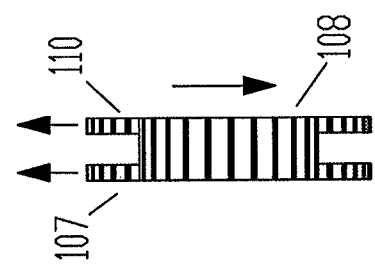
FIG. 24 is a schematic diagram illustrating the gear module as the transmission mechanism of the non-contact rotary bearing according to the present invention.

In one embodiment of the present invention, please refer to FIG. 22, FIG. 23 and FIG. 24. FIG. 22 is a main diagram illustrating the gear module. FIG. 23 is a cross sectional view, and FIG. 24 is a schematic diagram.

The main bearing module 130 comprises at least one non-contact type rotary bearing 131. The transmission mechanism includes at least three gears. They are respectively the inner ring gear 107 mounted on the shaft 102, the first transmission gear 108 engaged with the inner ring gear 107, and an outer ring gear 110 connected with the outer ring 112. The shaft 102 shown here rotates clockwise. The first transmission gear 108 rotates counterclockwise. The outer ring gear 110 returns to rotate clockwise. Using the inner gear 107 and the outer ring gear 110 having the same size and the same number of teethes, the inner ring 111 of the main bearing uses the transmission mechanism to drive the outer ring 112 to rotate in the same direction and the linear speeds of the both are equal or nearly equal.

Figure 25:
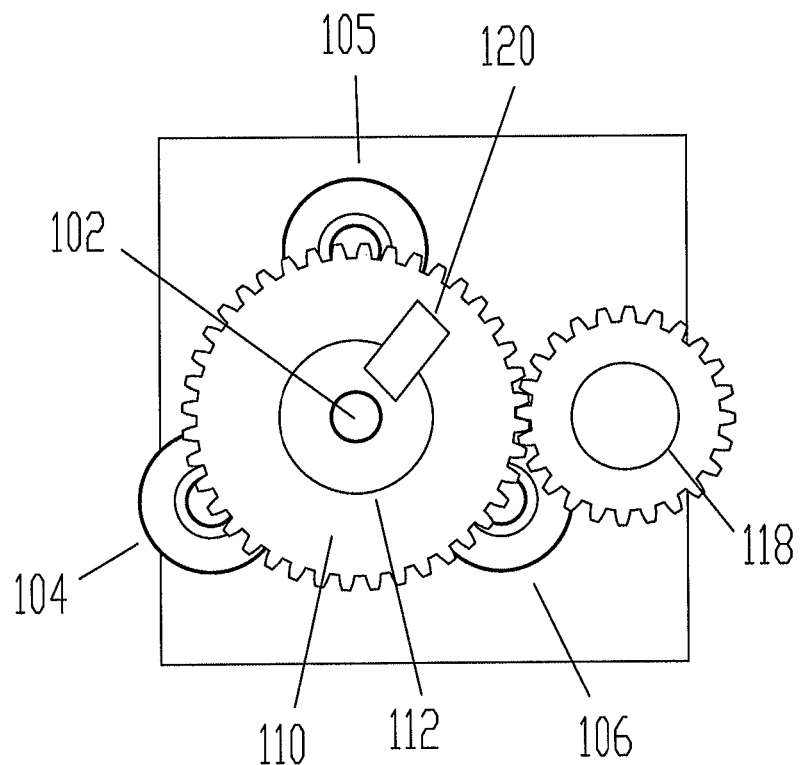
FIG. 25 is a main diagram illustrating the motor and the rotation speed sensor as the transmission mechanism of the non-contact type rotary bearing according to the present invention.
Figure 26:
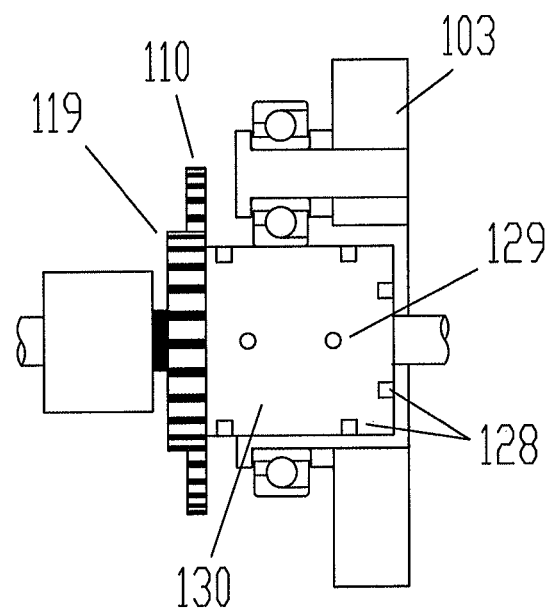
FIG. 26 is a cross sectional view illustrating the motor and the rotation speed sensor as the transmission mechanism of the non-contact type rotary bearing according to the present invention.

In another embodiment of the present invention, in the application for the non-contact type bearing, please refer to FIG. 25 and FIG. 26. FIG. 25 is a main diagram illustrating the motor and the rotation speed sensor as the transmission mechanism of the non-contact type rotary bearing according to the present invention. FIG. 26 is a cross sectional view.

The motor 118 has a transmission gear 119, and transmission gear 119 engages with the outer ring gear 110 to and drives it to rotate. The rotation speed sensor 120 is located at a side of the shaft 102, and the rotation speed sensor 120 inputs the rotation speed and direction of the shaft 102 detected by it into the controller (not shown) of the motor 118. The motor 118 makes the outer ring and the inner ring rotate in the same direction and makes the linear speeds of the both equal or nearly equal.

Figure 27:
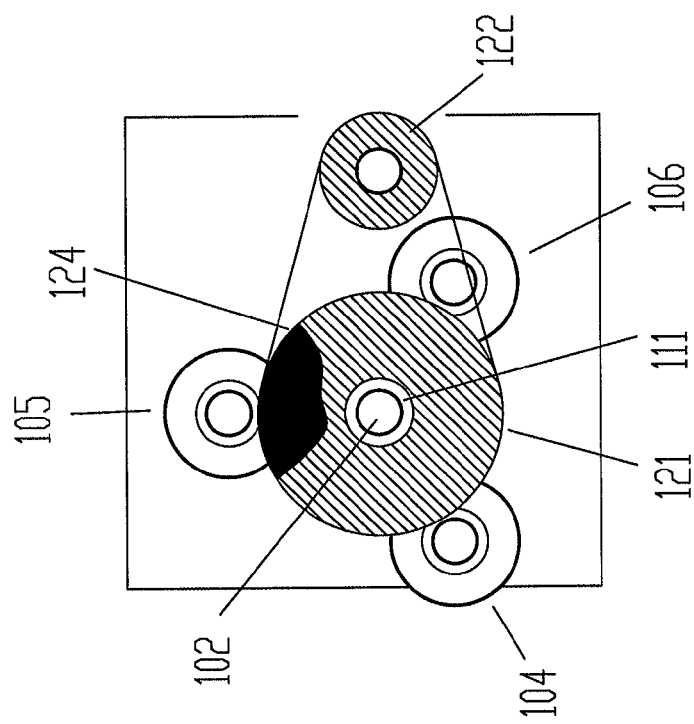
FIG. 27 is a main diagram illustrating the transmission belt as the transmission mechanism of the non-contact type rotary bearing according to the present invention.
Figure 28:
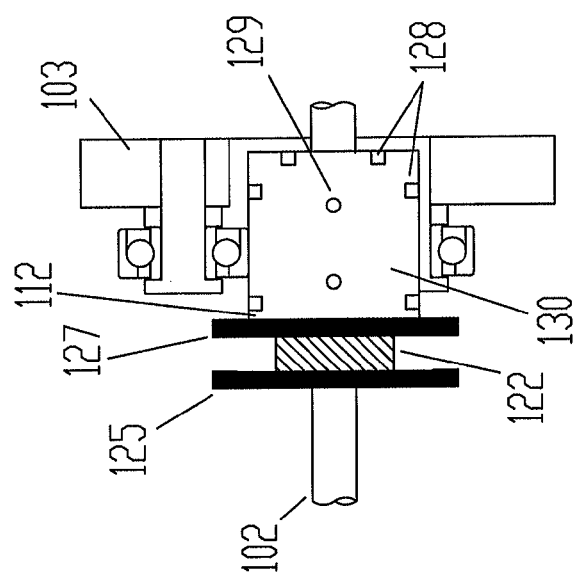
FIG. 28 is a cross sectional view illustrating the transmission belt as the transmission mechanism of the non-contact type rotary bearing according to the present invention.
Figure 29:
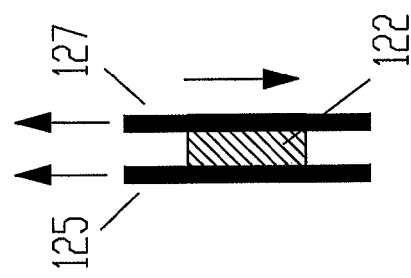
FIG. 29 is a schematic diagram illustrating the transmission belt as the transmission mechanism of the non-contact type rotary bearing according to the present invention.

In another embodiment of the present invention and in the application for the non-contact type bearing, please refer to FIG. 27 and FIG. 28. FIG. 27 is a main diagram illustrating the transmission belt as the transmission mechanism of the non-contact type rotary bearing according to the present invention. FIG. 28 is a cross sectional view. FIG. 29 is a schematic diagram illustrating the transmission belt as the transmission mechanism.

The inner ring 111 connects with the inner pulley 121. It also provides with a first pulley 122 and an outer pulley 124. The inner ring belt 125 drives the first pulley 122. The first pulley 122 drives the outer ring belt 127 such that the outer ring 112 and the inner ring 111 rotate in the same direction and the linear speeds of the both are equal or nearly equal.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A mechanism for adjusting the rotation speed and direction of an inner ring and an outer ring in a rotation bearing, comprising:
  a base;
  a main bearing module being through the base, comprising at least one main bearing having an inner ring, an outer ring, and multiple rolling elements, wherein the inner ring connects to a shaft;
  multiple supporting rotary bearings mounted on the base and surrounded the main bearing module; and
  a transmission mechanism connected with the main bearing module to make the inner ring and the outer ring rotate in opposite direction and make the linear speeds of the inner ring and the outer ring equal to or nearly equal to the tangential speeds of the rolling elements.

2. The mechanism for adjusting the rotation speed and direction of an inner ring and an outer ring in a rotation bearing according to claim 1, wherein the transmission mechanism is a motor and a rotation speed sensor.

3. The mechanism for adjusting the rotation speed and direction of an inner ring and an outer ring in a rotation bearing according to claim 1, wherein the transmission mechanism is a transmission belt.

4. The mechanism for adjusting the rotation speed and direction of an inner ring and an outer ring in a rotation bearing according to claim 1, wherein the transmission mechanism is a gear module.

5. The mechanism for adjusting the rotation speed and direction of an inner ring and an outer ring in a rotation bearing according to claim 1, wherein the main bearing is a ball bearing, a roller bearing, or a needle bearing.

6. A mechanism for adjusting the rotation speed and direction of an inner ring and an outer ring in a rotation bearing, comprising:
a base;
a main bearing module being through the base, comprising at least one main bearing having an inner ring, an outer ring, and a fluid filled between the inner ring and the outer ring, wherein the inner ring connects to a shaft;
multiple supporting rotation bearings mounted on the base and surrounded the main bearing module;
a transmission mechanism connected with the main bearing module to make the outer ring and the inner ring rotate in the same direction and makes the linear speeds of the inner ring and the outer ring equal or nearly equal.

7. The mechanism for adjusting the rotation speed and direction of an inner ring and an outer ring in a rotation bearing according to claim 6, wherein the transmission mechanism is a motor and a rotation speed sensor.

8. The mechanism for adjusting the rotation speed and direction of an inner ring and an outer ring in a rotation bearing according to claim 6, wherein the transmission mechanism is a transmission belt.

9. The mechanism for adjusting the rotation speed and direction of an inner ring and an outer ring in a rotation bearing according to claim 6, wherein the transmission mechanism is a gear module.

10. The mechanism for adjusting the rotation speed and direction of an inner ring and an outer ring in a rotation bearing according to claim 6, wherein the main bearing is a hydraulic bearing or an air bearing.

* * * * *